US012755028B2

(12) United States Patent
Xiao et al.

(10) Patent No.: US 12,755,028 B2
(45) Date of Patent: Oct. 6, 2026

(54) BLOCKCHAIN-BASED ANONYMOUS TRUSTED VOTING METHOD, APPARATUS AND RELATED DEVICE

(71) Applicants: ELECTRIC POWER RESEARCH INSTITUTE, CHINA SOUTHERN POWER GRID, Guangzhou (CN); GUIZHOU POWER GRID CO., LTD., Guiyang (CN)

(72) Inventors: Yong Xiao, Guangzhou (CN); Jiaxiang Ou, Guiyang (CN); Yi Luo, Guangzhou (CN); Houpeng Hu, Guiyang (CN); Bin Qian, Guangzhou (CN); Peilin He, Guiyang (CN); Mi Zhou, Guangzhou (CN); Yaodan Deng, Guiyang (CN); Ji Wang, Guangzhou (CN); Tianqiang Dong, Guiyang (CN); Fusheng Li, Guangzhou (CN); Pengcheng Li, Guiyang (CN); Fan Zhang, Guangzhou (CN); Yanhong Xiao, Guiyang (CN); Xiaoming Lin, Guangzhou (CN); Gaoyi Long, Guiyang (CN); Jianlin Tang, Guangzhou (CN); Kunlin He, Guiyang (CN); Chaoying Liu, Guiyang (CN); Hangfeng Li, Guiyang (CN); Zerui Chen, Guiyang (CN)

(73) Assignees: POWER RESEARCH INSTITUTE, CHINA SOUTHERN POWER GRID, Guangzhou (CN); GUIZHOU POWER GRID CO., LTD., Guiyang (CN)

( * ) Notice: Subject to any disclaimer, the term of this patent is extended or adjusted under 35 U.S.C. 154(b) by 134 days.

(21) Appl. No.: 18/562,874

(22) PCT Filed: Sep. 2, 2022

(86) PCT No.: PCT/CN2022/116770

§ 371 (c)(1),
(2) Date: Nov. 21, 2023

(87) PCT Pub. No.: WO2023/201962

PCT Pub. Date: Oct. 26, 2023

(65) Prior Publication Data

US 2024/0273649 A1 Aug. 15, 2024

(30) Foreign Application Priority Data

Apr. 21, 2022 (CN) ........................ 202210422851.X

(51) Int. Cl.
*G06F 21/60* (2013.01)
*H04L 9/32* (2006.01)

(52) U.S. Cl.
CPC ............ *G06F 21/60* (2013.01); *H04L 9/3236* (2013.01); *H04L 9/3252* (2013.01);
(Continued)

(58) Field of Classification Search
None
See application file for complete search history.

(56) References Cited

U.S. PATENT DOCUMENTS 8,433,903 B2 * 4/2013 Zick ...................... H04L 9/3013 713/168
10,388,097 B1 * 8/2019 Ivanov .................. G06F 21/602
(Continued)

FOREIGN PATENT DOCUMENTS

CA 3088712 A1 * 9/2019 ........... H04L 9/3247
CN 104392534 A 3/2015
(Continued)

OTHER PUBLICATIONS

D. Yin, M. Zhang and B. Wei, "Blockchain E-voting Scheme Based on SM9 Partial Blind Signature," 2021 International Conference on Computer Information Science and Artificial Intelligence (CISAI), Kunming, China, 2021. https://ieeexplore.ieee.org/document/9718922?source=IQplus (Year: 2021).*
(Continued)

*Primary Examiner* — El Mehdi Oussir
(74) *Attorney, Agent, or Firm* — Yue (Robert) Xu; Apex Attorneys at Law, LLP

(57) ABSTRACT

A trusted anonymous voting method includes: performing a hash operation on original voting content to obtain a hash
(Continued)

output including a commitment value $c_{v_i}$; blinding the commitment value $c_{v_i}$ based on information of other voters to obtain commitment value tuples $\tilde{c}$ and $\tilde{x}$; signing the commitment value tuple $\tilde{c}$ by using an ESDSA to obtain a signature tuple $\tilde{s}$; and establishing a vote tuple $(\tilde{c}, \tilde{s}, \tilde{d})$ based on the commitment value tuple $\tilde{c}$, the signature tuple $\tilde{s}$ and a signature tuple $\acute{d}$ of other voters, and uploading the vote tuple $(\acute{c}, \acute{s}, \acute{d})$ and the commitment value tuple $\tilde{x}$ to the blockchain, where signature tuple $\tilde{d}$ is generated in a case that other voters verify the signature tuple $\tilde{s}$ and the signature tuple $\tilde{s}$ passes the verification, and the commitment value tuple $\tilde{x}$ is used to decrypt the vote tuple.

8 Claims, 4 Drawing Sheets

(52) U.S. Cl.
CPC ..... *G06Q 2220/00* (2013.01); *G06Q 2230/00* (2013.01); *H04L 2209/463* (2013.01)

(56) References Cited

U.S. PATENT DOCUMENTS

| | | | | |
|---|---|---|---|---|
| 10,445,965 | B2 * | 10/2019 | Ivanov | H04L 9/0643 |
| 10,504,314 | B2 * | 12/2019 | Ivanov | H04L 9/30 |
| 10,630,483 | B2 * | 4/2020 | Riley | H04W 12/06 |
| 11,069,170 | B2 * | 7/2021 | Zhang | G06F 21/6263 |
| 11,074,775 | B2 * | 7/2021 | Ivanov | H04L 9/0637 |
| 11,373,152 | B2 * | 6/2022 | Wright | G06F 16/27 |
| 11,721,152 | B2 * | 8/2023 | Ivanov | H04L 9/088 713/168 |
| 12,003,660 | B2 * | 6/2024 | Bernardi | H04L 67/104 |
| 12,238,168 | B1 * | 2/2025 | Thomason | H04L 67/1097 |
| 2010/0317420 | A1 * | 12/2010 | Hoffberg | G06Q 30/0282 463/1 |
| 2013/0159021 | A1 * | 6/2013 | Felsher | G16H 10/60 705/3 |
| 2014/0173281 | A1 * | 6/2014 | Hwang | H04L 9/3255 713/171 |
| 2017/0352219 | A1 * | 12/2017 | Spanos | G07C 13/00 |
| 2018/0240107 | A1 * | 8/2018 | Andrade | G06Q 20/065 |
| 2019/0109713 | A1 * | 4/2019 | Clark | G06F 16/182 |
| 2019/0236879 | A1 * | 8/2019 | Ivanov | H04L 9/088 |
| 2019/0236880 | A1 * | 8/2019 | Ivanov | H04L 9/0637 |
| 2019/0236881 | A1 * | 8/2019 | Ivanov | H04L 9/32 |
| 2020/0013251 | A1 * | 1/2020 | Ivanov | H04L 9/30 |
| 2020/0272619 | A1 * | 8/2020 | Alferov | H04L 9/3239 |
| 2021/0176221 | A1 * | 6/2021 | Li | H04L 63/0457 |
| 2021/0327191 | A1 * | 10/2021 | Ivanov | H04L 9/3066 |
| 2022/0406114 | A1 * | 12/2022 | Pospieszalski | G06K 1/121 |
| 2024/0037192 | A1 * | 2/2024 | Bernardi | H04L 9/3297 |
| 2024/0185191 | A1 * | 6/2024 | Bernardi | H04L 9/50 |
| 2024/0273649 | A1 * | 8/2024 | Xiao | G06Q 50/06 |
| 2025/0260565 | A1 * | 8/2025 | Abdelsamie | H04L 9/3239 |
| 2025/0373446 | A1 * | 12/2025 | Anderson | H04L 9/3257 |

FOREIGN PATENT DOCUMENTS

| | | | | |
|---|---|---|---|---|
| CN | 104717067 | A * | 6/2015 | |
| CN | 107210914 | A * | 9/2017 | H04L 9/0822 |
| CN | 108027867 | A * | 5/2018 | G06F 12/1408 |
| CN | 108494581 | A * | 9/2018 | H04L 9/3013 |
| CN | 108833082 | A * | 11/2018 | G07C 13/00 |
| CN | 109286497 | A * | 1/2019 | H04L 63/0407 |
| CN | 110232764 | A * | 9/2019 | G07C 13/00 |
| CN | 110492990 | A * | 11/2019 | H04L 9/0891 |
| CN | 110555933 | A * | 12/2019 | G07C 13/00 |
| CN | 110601853 | A * | 12/2019 | H04L 9/3247 |
| CN | 110612547 | A * | 12/2019 | G06Q 20/38 |
| CN | 110880113 | A * | 3/2020 | H04L 9/3297 |
| CN | 110995410 | A * | 4/2020 | H04L 9/3066 |
| CN | 111427957 | A * | 7/2020 | G06F 16/2255 |
| CN | 111612457 | A * | 9/2020 | G06Q 20/3828 |
| CN | 109040067 | B * | 12/2020 | H04L 9/3066 |
| CN | 112118253 | A * | 12/2020 | H04L 67/1097 |
| CN | 112184066 | A * | 1/2021 | G06F 21/602 |
| CN | 112235260 | A * | 1/2021 | H04L 63/0421 |
| CN | 112558856 | A * | 3/2021 | G06F 21/602 |
| CN | 109903450 | B * | 4/2021 | |
| CN | 110428293 | B * | 6/2021 | G06F 16/2428 |
| CN | 113139884 | A * | 7/2021 | H04L 9/3066 |
| CN | 110719172 | B * | 8/2021 | H04L 9/3226 |
| CN | 110232764 | B * | 9/2021 | G07C 13/00 |
| CN | 108768607 | B * | 10/2021 | H04L 9/008 |
| CN | 113472868 | A * | 10/2021 | H04L 67/1095 |
| CN | 113709096 | A * | 11/2021 | H04L 63/08 |
| CN | 113792282 | A * | 12/2021 | G06F 21/33 |
| CN | 114547636 | A * | 5/2022 | G06F 21/6227 |
| CN | 114629660 | A | 6/2022 | |
| CN | 111159288 | B * | 4/2023 | G06F 21/64 |
| CN | 111372243 | B * | 5/2023 | H04W 12/02 |
| CN | 116311661 | A * | 6/2023 | G07C 13/00 |
| CN | 116405220 | A * | 7/2023 | H04L 9/50 |
| CN | 116472530 | A * | 7/2023 | G06F 21/64 |
| CN | 116541874 | A * | 8/2023 | G06F 21/6227 |
| CN | 116582284 | A * | 8/2023 | H04L 63/0442 |
| CN | 116932638 | A * | 10/2023 | G06F 16/27 |
| CN | 117118587 | A * | 11/2023 | H04L 9/50 |
| CN | 111445333 | B * | 12/2023 | G06Q 40/04 |
| CN | 117221337 | A * | 12/2023 | H04L 9/3239 |
| CN | 117371010 | A * | 1/2024 | G06F 21/602 |
| CN | 117376366 | A * | 1/2024 | H04L 67/1095 |
| CN | 117670352 | A * | 3/2024 | G06Q 40/04 |
| CN | 117714065 | A * | 3/2024 | G06Q 40/04 |
| CN | 111881481 | B * | 4/2024 | G06F 21/6245 |
| CN | 117935423 | A * | 4/2024 | G06F 21/64 |
| CN | 110599168 | B * | 5/2024 | G06Q 20/40145 |
| CN | 111507839 | B * | 7/2024 | G06Q 20/401 |
| CN | 118355399 | A * | 7/2024 | H04L 9/3247 |
| CN | 118627841 | A * | 9/2024 | H04L 9/0825 |
| CN | 118677612 | A * | 9/2024 | H04L 67/104 |
| CN | 113949724 | B * | 10/2024 | H04L 9/3066 |
| CN | 114254345 | B * | 3/2025 | G06Q 40/04 |
| CN | 119865362 | A * | 4/2025 | H04L 9/40 |
| CN | 120105494 | A * | 6/2025 | G06N 5/01 |
| CN | 120415891 | A * | 8/2025 | H04L 9/40 |
| CN | 120542699 | A * | 8/2025 | G01N 29/11 |
| CN | 121032523 | A * | 11/2025 | G06K 19/07726 |
| CN | 121396657 | B * | 3/2026 | |
| EP | 3903445 | B1 * | 8/2025 | H04L 9/085 |
| JP | 2004320562 | A * | 11/2004 | |
| JP | 2022545586 | A * | 10/2022 | H04L 9/3247 |
| KR | 102120882 | B1 * | 9/2019 | |
| KR | 102186029 | B1 * | 12/2020 | G06Q 50/26 |
| KR | 20210051077 | A * | 5/2021 | H04L 9/50 |
| KR | 102591165 | B1 * | 10/2023 | G06Q 40/06 |
| KR | 20250074119 | A * | 5/2025 | G06F 21/10 |
| LU | 102137 | B1 * | 4/2021 | H04L 9/50 |
| NL | 2026712 | A * | 10/2020 | |
| WO | WO-2016022864 | A2 * | 2/2016 | G06F 12/14 |
| WO | WO-2019043589 | A1 * | 3/2019 | H04L 9/0637 |
| WO | WO-2019071113 | A1 * | 4/2019 | H04L 9/3239 |
| WO | WO-2021218335 | A1 * | 11/2021 | G06F 21/602 |
| WO | WO-2021238527 | A1 * | 12/2021 | H04L 9/50 |
| WO | WO-2023122182 | A1 * | 6/2023 | H04L 9/3297 |
| WO | WO-2024043937 | A1 * | 2/2024 | H04L 9/3247 |
| WO | WO-2024148027 | A1 * | 7/2024 | G06Q 20/389 |
| WO | WO-2024148028 | A1 * | 7/2024 | H04L 9/50 |
| WO | WO-2025139183 | A1 * | 7/2025 | H04N 7/15 |

OTHER PUBLICATIONS

D. Yin, M. Zhang and B. Wei, “Blockchain E-voting Scheme Based on SM9 Partial Blind Signature,” 2021 International Conference on Computer Information Science and Artificial Intelligence (CISAI), Kunming, China, 2021. https://ieeexplore.org/document/9718922?source=IQplus (Year: 2021).*

H. Pu, Z. Cui, T. Liu and J. Rao, “An Electronic Voting Scheme Based on FOO Protocol,” 2020 3rd International Conference on Advanced Electronic Materials, Computers and Software Engineer-

(56) References Cited

OTHER PUBLICATIONS ing (AEMCSE), Shenzhen, China, 2020, https://ieeexplore.ieee.org/document/9131242?source=IQplus (Year: 2020).*
Y. Zhang, Y. Li, L. Fang, P. Chen and X. Dong, "Privacy-protected Electronic Voting System Based on Blockchin and Trusted Execution Environment," 2019 IEEE 5th International Conference on Computer and Communications (ICCC), China, 2019, https://ieeexplore.ieee.org/document/9064387?source=IQpluS (Year: 2019).*
International Search Report for PCT/CN2022/116770 mailed Dec. 16, 2022, ISA/CN.
Michael Backes etc., Using Mobile Device Communication to Strengthene—Voting Protocols.
Xuechao Yang, etc., Blockchain voting Publicly verifiable online voting protocol without trusted tallying authorities, Future Generation Computer Systems 112 (2020) 859-874.
Ben Adida, Helios Web-based Open-Audit Votin, 17th USENIX Security Symposium.

* cited by examiner

BLOCKCHAIN-BASED ANONYMOUS TRUSTED VOTING METHOD, APPARATUS AND RELATED DEVICE

The present application claims priority to Chinese Patent Application No. 202210422851.X, titled "BLOCKCHAIN-BASED ANONYMOUS TRUSTED VOTING METHOD, APPARATUS AND RELATED DEVICE", filed on Apr. 21, 2022 with the China National Intellectual Property Administration, which is incorporated herein by reference in its entirety.

FIELD

The present disclosure relates to the technical field of blockchains, and in particular to a trusted anonymous voting method and apparatus based on a blockchain, and a related device.

BACKGROUND

The rapid development of a smart power grid system promotes the emergence of a modern power system known as "Internet of Energy" (IoE), which has drawn great interest from many countries. As an Internet-based solution for addressing energy issues, IoE has many key technologies and challenges to be addressed. One of the most common activities in the IoE is voting. For example, people may choose a proper energy broker through electronic voting. Although there are many electronic voting solutions, the IoE has a stricter requirement for the electronic voting solutions.

In addition to some common requirements such as correctness, eligibility, and coercion resistance in the electronic voting solutions, deployment of a voting service in the IoE is further required to meet requirements such as decentralization, anonymity, verifiability, and efficiency. Firstly, it is critical to handle voting without any kind of trusted third party (TTP) due to open and distributed features of the IoE. Secondly, it is critical to provide anonymity for voters enough because in a peer-to-peer marketplace of the IoE, a candidate may harm the voters in many unmonitored ways. Next, verifiability is provided because illegal activities are audited and punished in the IoE. Finally, basic services in the IoE are efficient and compatible with the system.

Although a series of effective protocols for anonymous electronic voting are provided in previous studies (for example, the electronic voting solution proposed by Helios and Backes et al.: [Ben Adida. Helios: Web-based open-audit voting. In USENIX security symposium, volume 17, 2018] and [Michael Backes, Martin Gagné, and Malte Skoruppa. Using mobile device communication to strengthen e-voting protocols. In Proceedings of the 12th ACM workshop on Workshop on privacy in the electronic society, pages 237-242, 2013]), a consistent view is to be provided by a web server implemented by an administrator or authority in the most solutions. As a result, a trusted third party is involved. However, with the trusted third party, the protocols are subjected to a single point of failure and are not available for a trustless environment in a new-style Internet.

Another issue is to provide verifiability along with anonymity, and the verifiability and anonymity seem to be two contradictory design goals. Some voting solutions (for example, an anonymous voting solution based on a blockchain proposed by Yang et al.: [Xuechao Yang, Xun Yi, Surya Nepal, Andrei Kelarev, and Fengling Han. Blockchain voting: Publicly verifiable online voting protocol without trusted tallying authorities. Future Generation Computer Systems, 112: 859-874, 2020]) have solved the issue through blockchain technology. However, lack of efficiency is the most defects in the technology.

SUMMARY

In view of this, a trusted anonymous voting method and apparatus based on a blockchain, and a related device are provided according to the present disclosure, to realize decentralized anonymous voting.

In order to achieve the above objectives, a trusted anonymous voting method based on a blockchain is provided according to a first aspect of the present disclosure. The method includes: performing a hash operation on original voting content to obtain a hash output, where the hash output includes a commitment value $c_{v_i}$; blinding the commitment value $c_{v_i}$ based on information of other voters to obtain a commitment value tuple $\tilde{c}$ and a commitment value tuple $\tilde{x}$; signing the commitment value tuple $\tilde{c}$ by using an elliptic curve digital signature algorithm (ECDSA) to obtain a signature tuple $\tilde{s}$; and establishing a vote tuple $(\tilde{c}, \tilde{s}, \tilde{d})$ based on the commitment value tuple $\tilde{c}$, the signature tuple $\tilde{s}$ and a signature tuple $\tilde{d}$ of other voters, and uploading the vote tuple $(\tilde{c}, \tilde{s}, \tilde{d})$ and the commitment value tuple $\tilde{x}$ to the blockchain, where vote tuple $(\tilde{c}, \tilde{s}, \tilde{d})$ serves as voting content in a voting stage, where the signature tuple $\tilde{d}$ is generated in a case that other voters verify the signature tuple $\tilde{s}$ and the signature tuple $\tilde{s}$ passes the verification, and the commitment value tuple $\tilde{x}$ is used to decrypt the vote tuple.

Preferably, the performing a hash operation on original voting content to obtain a commitment value $c_{v_i}$ includes: performing the hash operation on the original voting content m and a string o to obtain the commitment value $c_{v_i}$, where the string o is randomly generated.

Preferably, the blinding the commitment value $c_{v_i}$ based on information of other voters to obtain a commitment value tuple $\tilde{c}$ and a commitment value tuple $\tilde{x}$ includes: performing, for each of other voters, a point multiplication operation in an elliptic curve cryptography (ECC) on public key information $pk_j$ and $\widehat{pk_j}$ of the voter to obtain a blinding factor $t_j$; hashing the commitment value $c_{v_i}$ based on the blinding factor $t_j$ to a new commitment value $x_j$ and a new commitment value $c_j$; and collecting commitment values $x_j$ to obtain a commitment value tuple $\tilde{x}$, and signing each of commitment values $c_j$ by using a private key $sk_i$ to obtain the commitment value tuple $\tilde{c}$.

Preferably, the signing the commitment value tuple $\tilde{c}$ by using the ECDSA to obtain a signature tuple $\tilde{s}$ includes: performing the hash operation on a tuple $(ID_i, addr_i, \widehat{c_{n_v}})$ to obtain the signature tuple $\tilde{s}$, where $ID_i$ and $addr_i$ represent identification and address information of a target voter respectively, and $\widehat{c_{n_v}}$ represents a commitment value in the commitment value tuple $\tilde{c}$ corresponding to a voter $n_v$.

Preferably, the hash output further includes a commitment value $o_{v_i}$, and the method further includes: obtaining the signature tuple $\tilde{d}$ and the commitment value tuple $\tilde{x}$ from the blockchain, and calculating a signature tuple $\tilde{y}$ of other voters based on the signature tuple $\tilde{d}$; verifying validity of $y_{n_v}$ based on the commitment value $c_{v_i}$ and the commitment value tuple $\tilde{x}$ by using a preset algorithm VerifyS to obtain all signature elements $y_{n_v}$ that pass the verification, where $y_{n_v}$ represents a signature element in the signature tuple $\tilde{y}$ corresponding to the voter $n_v$; obtaining a commitment string $x_{n_v}$ corresponding to each of the signature elements $y_{n_v}$ that pass the verification, establishing a new signature tuple $\tilde{y}$ based on all the signature elements $y_{n_v}$ that pass the verification, and establishing a new commitment tuple $\tilde{x}$ based on all commitment strings $x_{n_v}$; and uploading a vote tuple $(c_{v_i}, o_{v_i}, \tilde{x}, \tilde{y})$ to the blockchain with a random address, where the vote tuple $(c_{v_i}, o_{v_i}, \tilde{x}, \acute{y})$ serves as voting content in an opening voting stage.

Preferably, the trusted anonymous voting method based on a blockchain further includes: obtaining the vote tuple $(c_{v_i}, o_{v_i}, \tilde{x}, \tilde{y})$ from the blockchain, and verifying the signature tuple $\tilde{y}$ by using a preset algorithm V; and verifying, in a case that more than a preset proportion of signature elements $\hat{y}$ in the signature tuple $\tilde{y}$ pass the verification, the original voting content based on the commitment tuples $c_{v_i}$ and $o_{v_i}$ by using the preset algorithm.

Preferably, the verifying the original voting content based on the commitment tuples $c_{v_i}$ and $o_{v_i}$ by using the preset algorithm includes: serializing the commitment tuple $o_{v_i}$ to obtain a serialized string of commitment tuple $o_{v_i}$; performing the hash operation on the inputted original voting content m and the serialized string of commitment tuple $o_{v_i}$, to obtain a hash value $\hat{c}$; and determining whether $\hat{c}$ is equal to $c_{v_i}$, and determining that the original voting content m passes the verification, in a case that $\hat{c}$ is equal to $c_{v_i}$.

A trusted anonymous voting apparatus based on a blockchain is provided according to a second aspect of the present disclosure. The apparatus includes a commitment unit, a blinding unit, a signature unit, and a voting unit. The commitment unit is configured to perform a hash operation on original voting content to obtain a hash output, where the hash output includes a commitment value $c_{v_i}$. The blinding unit is configured to blind the commitment value $c_{v_i}$ based on information of other voters to obtain a commitment value tuple $\tilde{c}$ and a commitment value tuple $\tilde{x}$. The signature unit is configured to sign the commitment value tuple $\tilde{c}$ by using an elliptic curve digital signature algorithm (ECDSA) to obtain a signature tuple $\tilde{s}$. The voting unit is configured to establish a vote tuple $(\tilde{c}, \tilde{s}, \tilde{d})$ based on the commitment value tuple $\tilde{c}$, the signature tuple $\tilde{s}$ and a signature tuple $\tilde{d}$ of other voters, and upload the vote tuple $(\tilde{c}, \tilde{s}, \tilde{d})$ and the commitment value tuple $\tilde{x}$ to the blockchain, where the vote tuple $(\tilde{c}, \tilde{s}, \tilde{d})$ serves as voting content in a voting stage. The signature tuple $\tilde{d}$ is generated in a case that other voters verify the signature tuple $\tilde{s}$ and the signature tuple $\tilde{s}$ passes the verification, and the commitment value tuple $\tilde{x}$ is used to decrypt the vote tuple.

A trusted anonymous voting device based on a blockchain is provided according to a third aspect of the present disclosure. The device includes a memory and a processor. The memory is configured to store a program. The processor is configured to execute the program to perform the trusted anonymous voting method based on a blockchain described above.

A storage medium is provided according to a fourth aspect of the present disclosure. The storage medium stores a computer program. The computer program, when being executed by a processor, performs the trusted anonymous voting method based on a blockchain described above.

It can be seen from the above technical solutions that in the present disclosure, a hash operation is performed on the original voting content to obtain the hash output. The hash output includes the commitment value $c_{v_i}$. The hash operation enables the original voting content to be hidden well. Then, the commitment value $c_{v_i}$ is blinded based on the information of other voters, to obtain the commitment value tuples $\tilde{c}$ and $\tilde{x}$, so that identification of the voter is hidden well through the blinding. Next, the commitment value tuple $\tilde{c}$ is signed by using the ECDSA to obtain the signature tuple $\tilde{s}$. The commitment value tuple is signed by the voter himself, so that the voting content is authenticated by the target voter, thereby preventing the voting content from being forged by others. Finally, the vote tuple $(\tilde{c}, \tilde{s}, \tilde{d})$ is established based on the commitment value tuple $\tilde{c}$, the signature tuple $\tilde{s}$ and the signature tuple $\tilde{d}$ of other voters, and the vote tuple $(\tilde{c}, \tilde{s}, \tilde{d})$ and the commitment value tuple $\tilde{x}$ are uploaded to the blockchain. The vote tuple $(\tilde{c}, \tilde{s}, \tilde{d})$ serves as the voting content in the voting stage. The signature tuple $\tilde{d}$ is generated in a case that other voters verify the signature tuple $\tilde{s}$ and the signature tuple $\tilde{s}$ passes the verification. Due to verification and signature by other voters, the target voter cannot tamper with the voting content. The commitment value tuple $\tilde{x}$ is used to decrypt the vote tuple, facilitating subsequent opening of the voting content and tally. In the present disclosure, through the above processing, the voting content is hidden and anonymity and verifiability of the voting are achieved.

BRIEF DESCRIPTION OF THE DRAWINGS

In order to more clearly illustrate technical solutions in the embodiments of the present disclosure or in the conventional technology, drawings to be used in the description of the embodiments or the conventional technology are briefly introduced hereinafter. It is apparent that the drawings described below show merely the embodiments of the present disclosure, and other drawings may be obtained by those skilled in the art from the drawings without any creative work.

DETAILED DESCRIPTION OF THE EMBODIMENTS

Technical solutions in the embodiments of the present disclosure are described clearly and completely below in conjunction with the drawings in the embodiments of the present disclosure. Apparently, the embodiments described below are only some embodiments of the present disclosure, rather than all the embodiments. Any other embodiments obtained by those skilled in the art based on the embodiments in the present disclosure without any creative effort fall within the protection scope of the present disclosure.

Figure 1:
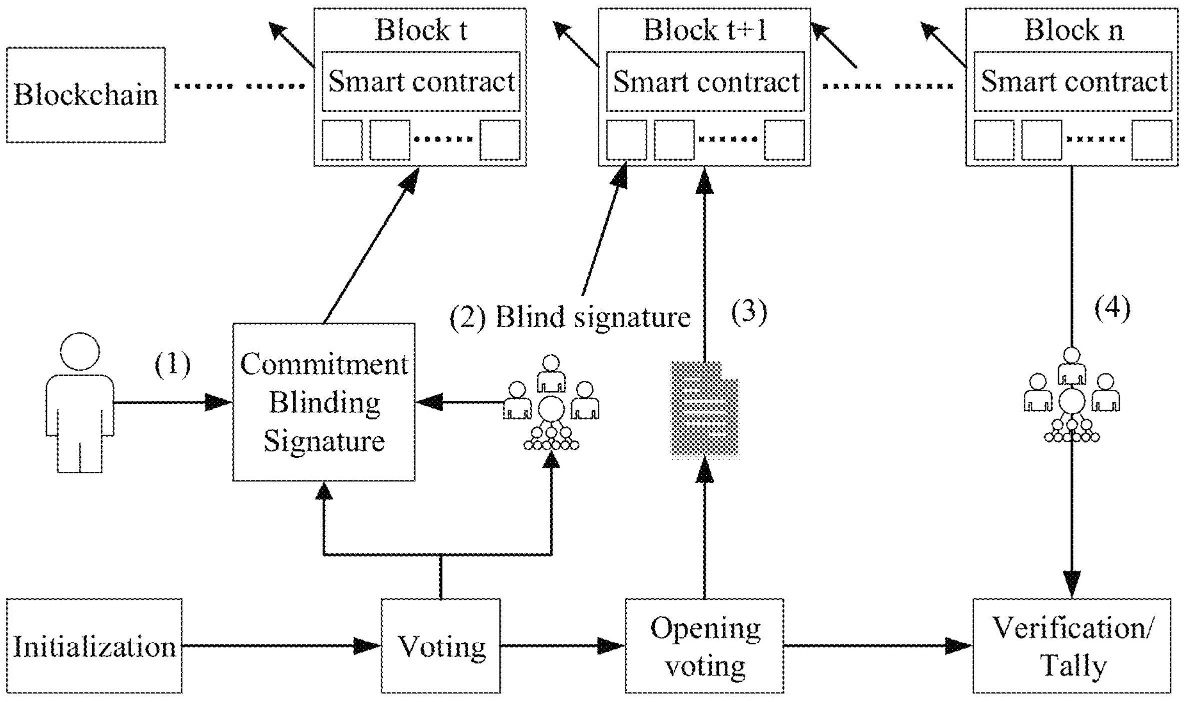
FIG. 1 is a schematic diagram showing overall design of a trusted anonymous voting method based on a blockchain according to an embodiment of the present disclosure.

For ease of understanding, an overall design idea of a trusted anonymous voting method based on a blockchain according to the present disclosure is introduced first. A main idea of the technical solution is introduced as follows with reference to FIG. 1. In order to vote for a ballot, a user first performs three cryptographic operations, i.e., commitment (for credibility), blinding (for anonymity) and signature (for verifiability) on a voting message to obtain a trusted anonymous voting result of original voting content, then performs a blind signature (for verifiability) on the trusted anonymous voting result by using a blind signature algorithm, and finally obtains voting information (expressed by a three-tuple) of the ballot. Then, the user uploads the voting information of the ballot to the blockchain, where a result of the blind signature is directly uploaded to the blockchain. In an opening voting stage, the user opens a commitment of a voting message obtained by the commitment and blinding, and the opened commitment is processed and uploaded to the blockchain. Finally, voting content (expressed by a four-tuple) of voters for the ballot is recorded in the blockchain. The user may verify whether the voting is valid in the blockchain. In a case that the voting is valid, a tally is performed for counting the voting result.

Figure 2:
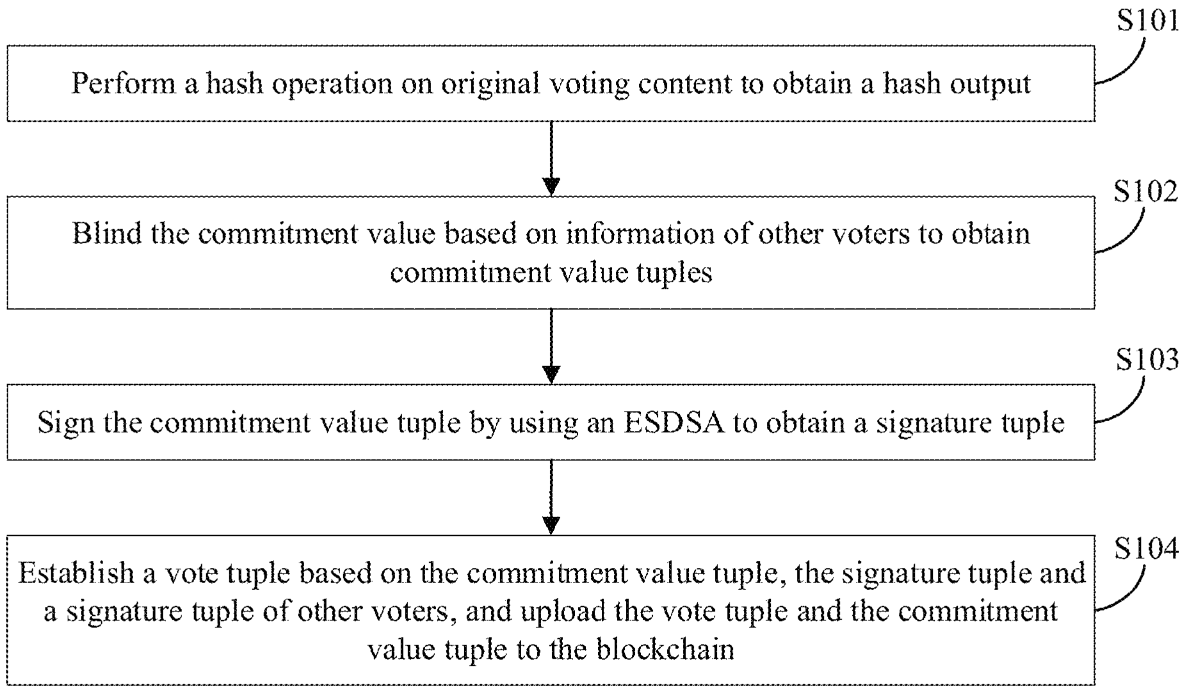
FIG. 2 is a flowchart of a trusted anonymous voting method based on a blockchain according to an embodiment of the present disclosure.

The trusted anonymous voting method based on a blockchain according to an embodiment of the present disclosure is described in detail below. It can be understood that anyone in an Internet of Energy (IoE) system may launch voting through this solution. All voters who want to participate in the voting are required to provide their public keys and identification. Therefore, there is an initialization stage before the voting is launched. In the initialization stage, all public information of the voters is broadcasted to the blockchain through a preset smart contract. It is assumed that there are $n_v$ different voters $v_1, v_2, \ldots, v_{n_v}$. Each of the voters $v_i$ generates two pairs of keys ($sk_{v_i}$, $pk_{v_i}$) and ($\widehat{sk_{v_i}}$, $\widehat{pk_{v_i}}$) through elliptic curve cryptography (ECC). Assuming that $addr_{v_i}$ represents a public address of the voter $v_i$ in the Ethereum network, $ID_{v_i}$ represents identification of the voter, and public information of the voter $v_i$ is expressed as a tuple ($ID_{v_i}$, $pk_{v_i}$, $\widehat{pk_{v_i}}$, $addr_{v_i}$). Each of the voters may obtain the information from the blockchain and verify validity of the information. After the above initialization phase, referring to FIG. 2, the trusted anonymous voting method based on a blockchain according to the embodiment of the present disclosure may include the following steps S101 to S104.

In step S101, a hash operation is performed on original voting content to obtain a hash output.

An input with an arbitrary length (also referred to as a pre-image) may be transformed into a hash output with a fixed length by using a hash algorithm. In this step, the hash output includes a commitment value $c_{v_i}$. This transformation is contraction mapping. That is, a size of a hash output is normally significantly smaller than a size of an input. Since different inputs may be hashed to a same hash output, the unique input cannot be determined from the hash output. The original voting content m is hashed to the commitment value $c_{v_i}$ through the hash operation, so that the voting content can be hidden well. Therefore, other voters cannot obtain the voting content until the vote is opened.

In step S102, the commitment value $c_{v_i}$ is blinded based on information of other voters to obtain a commitment value tuple $\tilde{c}$ and a commitment value tuple $\tilde{x}$.

The blinding may be performed by using a preset blind commitment algorithm. The information of other voters may be embedded in the commitment value $c_{v_i}$ through the blinding, thereby hiding identity information of a target voter, so as to achieve anonymous voting.

In step S103, the commitment value tuple $\tilde{c}$ is signed by using an ECDSA to obtain a signature tuple $\tilde{s}$.

The commitment value tuple $\tilde{c}$ is signed by using the ECDSA based on a private key of the target voter, so that the voting content is authenticated by the target voter, thereby preventing the voting content from being forged by others.

In step S104, a vote tuple ($\tilde{c}$, $\tilde{s}$, $\tilde{d}$) is established based on the commitment value tuple $\tilde{c}$, the signature tuple $\tilde{s}$ and a signature tuple $\tilde{d}$ of other voters, and the vote tuple ($\tilde{c}$, $\tilde{s}$, $\tilde{d}$) and the commitment value tuple $\tilde{x}$ are uploaded to the blockchain.

The signature tuple $\tilde{d}$ is generated in a case that other voters verify the signature tuple $\tilde{s}$ and the signature tuple $\tilde{s}$ passes the verification. The commitment value tuple $\tilde{x}$ is used to decrypt the vote tuple. The vote tuple ($\tilde{c}$, $\tilde{s}$, $\tilde{d}$) serves as the voting content in a voting stage.

In the embodiment of the present disclosure, a hash operation is performed on the original voting content to obtain the hash output. The hash output includes the commitment value $c_{v_i}$. The hash operation enables the original voting content to be hidden well. Then, the commitment value $c_{v_i}$ is blinded based on the information of other voters, to obtain the commitment value tuples $\tilde{c}$ and $\tilde{x}$, so that identification of the voter is hidden well through the blinding. Next, the commitment value tuple $\tilde{c}$ is signed by using the ECDSA to obtain the signature tuple $\tilde{s}$. The commitment value tuple is signed by the voter himself, so that the voting content is authenticated by the target voter, thereby preventing the voting content from being forged by others. Finally, the vote tuple ($\tilde{c}$, $\tilde{s}$, $\tilde{d}$) is established based on the commitment value tuple $\tilde{c}$, the signature tuple $\tilde{s}$ and the signature tuple $\tilde{d}$ of other voters, and the vote tuple ($\tilde{c}$, $\tilde{s}$, $\tilde{d}$) and the commitment value tuple $\tilde{x}$ are uploaded to the blockchain. The vote tuple ($\tilde{c}$, $\tilde{s}$, $\tilde{d}$) serves as the voting content in the voting stage. The signature tuple $\tilde{d}$ is generated in a case that other voters verify the signature tuple $\tilde{s}$ and the signature tuple $\tilde{s}$ passes the verification. Due to verification and signature by other voters, the target voter cannot tamper with the voting content. The commitment value tuple $\tilde{x}$ is used to decrypt the vote tuple, facilitating subsequent opening of the voting content and tally. In the present disclosure, through the above process, the voting content is hidden and anonymity and verifiability of the voting are achieved.

In some embodiments of the present disclosure, in the step S101, the hash operation is performed on the original voting content to obtain the commitment value $c_{v_i}$ by: performing the hash operation on the original voting content m and a string o to obtain the commitment value $c_{v_i}$. The string o is randomly generated.

For example, the above hash operation may be implemented by using an algorithm C, i.e., $(c_{v_i}, o_{v_i}) \leftarrow C(m_{v_i})$. Details of the algorithm C are as follows.

Algorithm C

```
Input (m)
Output (c, o)
1:  o=RandomBytes(32);
2: c=SHA256 (m + serialize(o));
3: Return (c, o) ;
```

The algorithm C first generates a random string with 32 bytes as an open string o in the commitment. A commitment string c is a hash value generated from the original voting content m and o by using a collision-resistant hash algorithm SHA256, where a function serialize( ) in the algorithm C is used to serialize the string o.

In some embodiments of the present disclosure, in the step S102, the commitment value $c_{v_i}$ is blinded based on the information of other voters to obtain the commitment value tuple $\tilde{c}$ and the commitment value tuple $\tilde{x}$ by the following steps S1 to S3.

In step S1, for each of other voters, a point multiplication operation in the elliptic curve cryptography (ECC) is performed on public key information $pk_j$ and $\widehat{pk}_j$ of the voter to obtain a blinding factor $t_j$.

In step S2, the commitment value $c_{v_i}$ is hashed to a new commitment value xi and a new commitment value $c_j$ based on the blinding factor $t_j$.

In step S3, commitment values $x_j$ are collected to obtain a commitment value tuple $\tilde{x}$ and each of commitment values $c_j$ is signed by using a private key $sk_i$ to obtain the commitment value tuple $\tilde{c}$.

For example, the blinding may be performed by using an algorithm BlindX to generate the blinded commitment value tuples $\tilde{c}=(\widehat{c_1}, \widehat{c_2}, \ldots, \widehat{c_{n_v}})$ and $\tilde{x}=(\widehat{x_1}, \widehat{x_2}, \ldots, \widehat{x_{n_v}})$ corresponding to different voters $v_1, v_2, \ldots, v_{n_v}$ other than the target voter, i.e., $(\tilde{x}, \tilde{c})\leftarrow$BlindX$(c_{v_i}, pk_{n_v}, \widehat{pk_{n_v}}, sk_i)$ (it should be noted that in this specification, a small letter with a superscript ~ represents a string vector including $n_v$ strings, and a small letter with a superscript ^ represents a string). Details of the algorithm BlindX are as follows.

Algorithm BlindX

```
Input (c_vi, p̃k_nv, p̃̃k_nv, sk_i)
Output (x̃, c̃, γ, δ)
 1:   γ=RandomBytes(32);
 2:   δ=RandomBytes(32);
 3:   forj=0 to n_v do
 4:     A_j = p̂k_j + γ * G + pk_j * δ;
 5:     t_j = getXpointFromPubkey(A_j)modn ;
 6:     x_j = SHA256(c_vi + t_j) ;
 7:     c_j = x_j − δ;
 8:     c̃.push(c_j) ;
 9:     H_i = SHA256(ID_i + addr_i + c_j) ;
10:     s_j=ECDSA.Sign(H_i, sk_i);
11:       s̃.push(s_j) ;
12:     endfor
13:     setAnmVote( addr_vi, ãddr, s̃, c̃ );
14:     Return (x̃, c̃, γ, δ) ;
```

The algorithm BlindX first randomly generates two random strings γ and δ each including 32 bytes for performing a point multiplication operation in the elliptic curve cryptography (ECC) on inputted public key information (in a line indicated by 4). Then, an X-coordinate of a point on an elliptic curve is determined as a blinding factor (in a line indicated by 5), where a function getXpointFromPubkey is used to determine an X-coordinate of a point on the elliptic curve in the ECC. Next, the original commitment $c_{v_i}$ is blinded to obtain new commitment values (in lines indicated by 6 and 7). In addition, the blinded commitment is signed for subsequent verification of authenticity. Specifically, a signature algorithm Sign in an ECDSA is called, and signing is performed by using the private key $sk_i$ of the voter $v_i$. Finally, the algorithm returns $(\tilde{x}, \tilde{c}, \gamma, \delta)$ as a blinding result.

In the algorithm BlindX, an algorithm setAnmVote in the smart contract in the blockchain is called, and is used to store address information of the voters, blinded string commitment information and signature information in the blockchain through a smart contract transaction. Firstly, a data structure is used to record information binding with the voter. For example, a structure in Table 1 may serve as the data structure (related to the voters) for recording that is stored in the blockchain. As shown in Table 1, address, PK, PKs and ID are basic public information, while the other three mapping data correspond to the vote tuple $(\tilde{c}, \tilde{s}, \tilde{d})$ of the voter for the ballot, and a data type of the three mapping data is a mapping vector characterized in that an index of the vector is represented by a data type of address in the blockchain.

TABLE 1

Blockchain data structure of voters

| Data type | Data description |
|---|---|
| address | voter |
| string | PK |
| string | PKs |
| string | ID |
| mapping(address string) | si |
| mapping(address string) | ci |
| mapping(address string) | dsigs |

The algorithm setAnmVote is an operation of uploading to the blockchain, and has no output. For example, details of the algorithm setAnmVote are as follows.

Algorithm setAnmVote

```
Input (iV, âddr, s, c)
 1:   if(msg.sender==iV)then
 2:   forj=0 to n_v do
 3:   iS= âddr[j]
 4:   is_i=ŝ[j]
 5:   ic_i= ĉ[j]
 6:   if(voters[iV].si[iS])==0)then
 7:   voters[iV].si[iS]=is_i; ;
 8:   voters[iV].ci[iS]=ic_i;
 9:   endif
10:     endfor
11:     endif
```

In an Ethereum blockchain, IV represents an address of the voter and iS represents an address of a potential signer, $iS_i$ and $iC_i$ represents data generated in the algorithm BlindX, voters represents an array corresponding to the data structure in Table 1, and msg.sender in a line indicated by 1 represents an address of a transaction sender who calls the algorithm in the smart contract in the blockchain. The requirement in the line indicated by 1 ensures that only the voter himself is allowed to set the data (that is valid when the smart contract is called). Finally, once the algorithm is executed successfully, the algorithm uploads $iS_i$ and $iC_i$ to the blockchain, and the data is recorded in the blockchain. Anyone including the voter himself is not allowed to reset the recorded data.

In some embodiments of the present disclosure, in the step S103, the commitment value tuple $\tilde{c}$ is signed by using the ECDSA to obtain the signature tuple $\tilde{s}$ by: performing the hash operation on a tuple $(ID_i, addr_i, \widehat{c_{n_v}})$ to obtain the signature tuple $\tilde{s}$.

$ID_i$ and $addr_i$ represent identification and address information of the target voter respectively, and $\widehat{c_{n_v}}$ represents a commitment value in the commitment value tuple $\tilde{c}$ corresponding to a voter $n_v$.

Firstly, a hash value $H_{n_v}$ of the tuple $(ID_i, addr_i, \widehat{c_{n_v}})$ corresponding to voters $v_1, v_2, \ldots, v_{n_v}$ is calculated, where $v_{n_v} \neq v_i$, and $v_i$ represents the target voter. The target voter signs for other different voters by using the signature algorithm in the ECDSA, i.e., $s_{n_v}$=ECDSA·Sign $(sk_i, H_{n_v})$, to obtain the signature tuple $\tilde{s}=(s_1, s_2, \ldots, s_{n_v})$.

Subsequently, information of ($ID_i$, $addr_i$, $\tilde{c}$, $\tilde{s}$) is recorded in the blockchain through the smart contract, by using the algorithm setAnmVote in the smart contract. In addition, it should be noted that $\tilde{x}$ is kept by the voter $v_i$ in secret in this stage.

In some embodiments of the present disclosure, in the step S104, the signature tuple $\tilde{d}$ of other voters may be calculated by using a preset algorithm BlindS.

First, each of other voters verifies validity of a signature by using a verification algorithm in the ECDSA. In order to verify the signature, the signature in the blockchain is queried by using an algorithm getAnmVote in the smart contract. In a case that it is verified that the signature is valid, the voter generates a blind signature $d_{n_v}$ in a blind signature protocol by using the blind signature algorithm BlindS, i.e., $d_{n_v} \leftarrow BlindS(\widehat{sk}_{n_v}, sk_{n_v})$, and uploads the blind signature $d_{n_v}$ to the blockchain by using an algorithm signAnmVote in the smart contract. Finally, $\tilde{d}=(d_1, d_2, \ldots, d_{n_v})$ is determined as a blind signature tuple of the different voters $v_1, v_2, \ldots, v_{n_v}$.

For example, details of the algorithm BlindS are as follows.

Algorithm BlindS

Input (($\widehat{sk}_{n_v}$, $sk_{n_v}$))
Output $d_{n_v}$
1: ($v$, $s_{n_v}$, $\hat{c}_{n_v}$)=getAnmtVote( $addr_i$, $addr_{n_v}$ );
2: if $v \neq addr_i$ then
3: Return 0
4: endif
5: H=SHA256( $ID_i + addr_i + \hat{c}_{n_v}$ );
6: S=ECDSA.Verify( $s_{n_v}$, H, $pk_i$);
7: ifS==Truethen
8: $d_{n_v}=\widehat{sk}_{n_v} - \hat{c}_{n_v} * sk_{n_v}$
9: else
10: Return 0
11: end if;
11: signAnmVote( $addr_i$ , $d_{n_v}$);
12: Return $d_{n_v}$ Firstly, the signer queries the commitment data ($v$, $s_{n_v}$, $\hat{c}_{n_v}$) generated for him by using the algorithm getAnmVote in the smart contract. Anyone is allowed to query the commitment data based on a public account address in the blockchain. Then, the validity of the signature in the commitment data is verified by using the hash algorithm SHA256 and the verification algorithm in the ECDSA in cryptography (where a verification result S is generated in the two steps). In a case that it is verified that the signature is valid (S==True), the voter as the signer generates the blind signature $d_{n_v}$ of the queried commitment $\hat{c}_{n_v}$ based on inputted private key parameters by using $\widehat{sk}_{n_v} - \hat{c}_{n_v} * sk_{n_v}$. Subsequently, the blind signature is uploaded to the blockchain by calling the algorithm signAnmVote in the smart contract for uploading to the blockchain. Similarly, a requirement in a line indicated by 2 ensures that only the signer himself is allowed to set corresponding data. Once the signature is recorded, anyone including the signer himself is not allowed to reset the signature. Finally, the algorithm BlindS returns the generated blind signature $d_{n_v}$.

Further, in the above algorithm BlindS, two algorithms getAnmVote and signAnmVote in the smart contract in the blockchain are called. The algorithm getAnmVote is an algorithm for query operation. For example, details of the algorithm getAnmVote are as follows.

Algorithm getAnmVote

Input (iV, iS)
Output (V, $is_i$, $ic_i$)
1: Return(voters[iV].voter,voters[iV].si[iS],voters[iV].ci[iS]);

The algorithm getAnmVote has two input parameters iV and iS, iV represents the address of the voter, and iS represents the address of the potential signer in the Ethereum blockchain. The algorithm getAnmVote outputs an address V, and a signature $is_i$ and a commitment $ic_i$ of the voter recorded in a current block in the blockchain. After the algorithm starts, the algorithm directly returns a field of voter, a field of an iV position of si, and a field of an iV position of ci corresponding to a current address iV in the data structure of voters.

The algorithm signAnmVote is the operation of uploading to the blockchain, and has no output. The algorithm signAnmVote is used to upload the blind signature generated by the algorithm BlindS to the blockchain. For example, details of the algorithm signAnmVote are as follows.

Algorithm signAnmVote

Input (iV, idsig)
1: if(voters[iV].voter==msg.sender and voters[iV].dsigs[msg.sender]).length==0)then
2: voters[iV].dsigs[msg.sender]=idsig;
3: endif The algorithm signAnmVote has two input parameters iV and idsig. In the blockchain, iV represents the address of the voter, and idsig represents a blind signature corresponding to the address. msg.sender in a line indicated by 1 represents an address (that is an address of the signer of the blind signature) of a transaction sender who calls the algorithm in the smart contract in the blockchain. The requirement in the line indicated by 1 ensures that only the signer himself is allowed to upload data to the blockchain.

A workflow of the voting stage is described above. At the end of this stage, ($\tilde{c}$, $\tilde{s}$, $\tilde{d}$) is the vote tuple of the target voter $v_i$ for the ballot $m_{v_i}$.

Next, an opening voting stage is described. In some embodiments of the present disclosure, the hash output mentioned in the above step S101 further includes a commitment value $o_{v_i}$, and the trusted anonymous voting method based on a blockchain may further include the following steps S105 to S108.

In step S105, the signature tuple $\tilde{d}$ and the commitment value tuple $\tilde{x}$ are obtained from the blockchain, and a signature tuple $\tilde{y}$ of other voters is calculated based on the signature tuple $\tilde{d}$.

In step S106, validity of a signature element $y_{n_v}$ is verified based on the commitment value $c_{v_i}$ and the commitment value tuple $\tilde{x}$ by using a preset algorithm VerifyS to obtain all signature elements $y_{n_v}$ that pass the verification.

Specifically, ($x_{n_v}$, $c_{v_i}$, $y_{n_v}$) is given, and the target voter $v_i$ may verify the validity of the signature element $y_{n_v}$ through an algorithm VerifyS($x_{n_v}$, $c_{v_i}$, $y_{n_v}$, $pk_{n_v}$). $x_{n_v}$ represents a commitment value stored in the blockchain. $y_{n_v}$ represents the signature element in the signature tuple $\tilde{y}$ corresponding to the voter $n_v$ for the commitment value $c_{v_i}$. The target voter $v_i$ may calculate $\tilde{y}$ according to $y_{n_v}=d_{n_v}+\gamma$. $\tilde{y}$ is expressed as $\tilde{y}=(y_1, y_2, \ldots, y_{n_v})$, and $\gamma$ represents a random key.

In step S107, a commitment string $x_{n_v}$ corresponding to each of the signature elements $y_{n_v}$ that passes the verification is obtained, a new signature tuple $\tilde{y}$ is established based on all the signature elements $y_{n_v}$ that pass the verification, and a new commitment tuple $\tilde{x}$ is established based on all commitment strings $x_{n_v}$.

In step S108, a vote tuple ($c_{v_i}$, $o_{v_i}$, $\tilde{x}$, $\tilde{y}$) is uploaded to the blockchain with a random address.

The vote tuple ($c_{v_i}$, $o_{v_i}$, $\tilde{x}$, $\tilde{y}$) may serve as voting content in the opening voting stage. It can be understood that the target voter v may select a random address in the blockchain to send the transaction, so that anyone cannot find out who sends the transaction.

For example, details of the algorithm VerifyS are as follows.

Algorithm VerifyS

```
Input (x_{n_v}, c_{v_i}, y_{n_v}, pk_{n_v})
Output True or False
B = x_{n_v} * pk_{n_v} * y_{n_v} * G
bx=getXpointFromPubkey(B) modn;
H=SHA256( c_{v_i}+bx);
if H == x_{n_v} then
ReturnTrue
else
ReturnFalse
end if
```

Firstly, a point B on the elliptic curve in the ECC is calculated. Subsequently, an X-coordinate of the point B on the elliptic curve is determined in the algorithm. Next, the algorithm performs a hash operation on the original commitment $c_{v_i}$ and the X-coordinate of the point B by using the SHA256 to obtain a hash value. In a case that the hash value is the same as the inputted value $x_{n_v}$, the commitment is valid. Finally, the algorithm outputs True or False based on the determination.

Next, a verification/tally stage is described. In some embodiments of the present disclosure, the trusted anonymous voting method based on a blockchain may further include the following steps S109 and S110.

In step S109, the vote tuple ($c_{v_i}$, $o_{v_i}$, $\tilde{x}$, $\tilde{y}$) is obtained from the blockchain, and the signature tuple $\tilde{y}$ is verified by using a preset algorithm V.

In step S110, in a case that more than a preset proportion of signature elements $\hat{y}$ in the signature tuple $\tilde{y}$ pass the verification, the original voting content is verified based on the commitment tuples $c_{v_i}$ and $o_{v_i}$ by using the preset algorithm.

In some embodiments of the present disclosure, in the step S110, the original voting content is verified based on the commitment tuples $c_{v_i}$ and $o_{v_i}$ by using the preset algorithm by the following steps S1 to S3.

In step S1, the commitment tuple $o_{v_i}$ is serialized to obtain a serialized string of commitment tuple $o_{v_i}$.

In step S2, the hash operation is performed on the inputted original voting content m and the serialized string of commitment tuple $o_{v_i}$ to obtain a hash value $\hat{c}$.

In step S3, it is determined whether $\hat{c}$ is equal to $c_{v_i}$. In a case that $\hat{c}$ is equal to $c_{v_i}$, it is determined that the original voting content m passes the verification.

For example, in the verification/tally stage, details of the algorithm V are as follows.

Algorithm V

```
Input (m, c, o)
Output True or False
  ĉ =SHA256(m+serialize(o));
if ĉ == c then
ReturnTrue;
else
ReturnFalse;
end if
```

Firstly, the hash operation is performed on the inputted original voting content m and o by using the hash algorithm SHA256 to obtain the hash value $\hat{c}$, where the function serialize( ) in the algorithm V is used to serialize the string o. Then, it is determined whether e is equal to the inputted c. In a case that $\hat{c}$ is equal to the inputted c, it indicates that the voting passes the verification and True is outputted, otherwise False is outputted.

A trusted anonymous voting apparatus based on a blockchain according to an embodiment of the present disclosure is described below. The trusted anonymous voting apparatus based on a blockchain described below and the trusted anonymous voting method based on a blockchain described above may be referred to each other.

Figure 3:
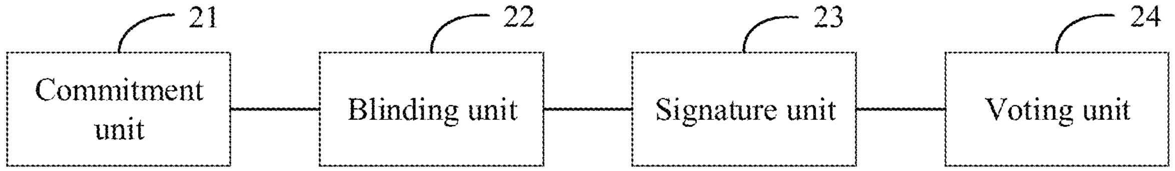
FIG. 3 is a schematic diagram of a trusted anonymous voting apparatus based on a blockchain according to an embodiment of the present disclosure.

Referring to FIG. 3, the trusted anonymous voting apparatus based on a blockchain according to an embodiment of the present disclosure may include a commitment unit 21, a blinding unit 22, a signature unit 23, and a voting unit 24.

The commitment unit 21 is configured to perform a hash operation on original voting content to obtain a hash output. The hash output includes a commitment value $c_{v_i}$.

The blinding unit 22 is configured to blind the commitment value $c_{v_i}$ based on information of other voters to obtain a commitment value tuple $\tilde{c}$ and a commitment value tuple $\tilde{x}$.

The signature unit 23 is configured to sign the commitment value tuple $\tilde{c}$ by using an ECDSA to obtain a signature tuple $\tilde{s}$.

The voting unit 24 is configured to establish a vote tuple ($\tilde{c}$, $\tilde{s}$, $\tilde{d}$) based on the commitment value tuple $\tilde{c}$, the signature tuple $\tilde{s}$ and a signature tuple $\tilde{d}$ of other voters, and upload the vote tuple ($\tilde{c}$, $\tilde{s}$, $\tilde{d}$) and the commitment value tuple $\tilde{x}$ to the blockchain. The vote tuple ($\tilde{c}$, $\tilde{s}$, $\tilde{d}$) serves as voting content in a voting stage.

The signature tuple $\tilde{d}$ is generated in a case that other voters verify the signature tuple s and the signature tuple $\tilde{s}$ passes the verification. The commitment value tuple $\tilde{x}$ is used to decrypt the vote tuple.

In some embodiments of the present disclosure, the commitment unit 21 may perform the hash operation on the original voting content to obtain the commitment value $c_{v_i}$ by: performing the hash operation on the original voting content m and a string o to obtain the commitment value $c_{v_i}$, where the string o is randomly generated.

In some embodiments of the present disclosure, the blinding unit 22 may blind the commitment value $c_{v_i}$ based on the information of other voters to obtain the commitment value tuple $\tilde{c}$ and the commitment value tuple $\tilde{x}$ by: performing, for each of other voters, a point multiplication operation in an elliptic curve cryptography (ECC) on public key information $pk_j$ and $\widehat{pk_j}$ of the voter to obtain a blinding factor $t_j$; hashing the commitment value $c_{v_i}$ based on the blinding factor $t_j$ to a new commitment value xi and a new commitment value $c_j$; and collecting commitment values $x_j$ to obtain a commitment value tuple $\tilde{x}$, and signing each of commitment values $c_j$ by using a private key $sk_i$ to obtain the commitment value tuple $\tilde{c}$.

In some embodiments of the present disclosure, the signing unit 23 may sign the commitment value tuple $\tilde{c}$ by using the ECDSA to obtain the signature tuple $\tilde{s}$ by: performing the hash operation on a tuple ($ID_i$, $addr_i$, $\widehat{c_{n_v}}$) to obtain the signature tuple $\tilde{s}$, where $ID_i$ and $addr_i$ represent identification and address information of a target voter respectively, and $\widehat{c_{n_v}}$ represents a commitment value in the commitment value tuple $\tilde{c}$ corresponding to the voter $n_v$.

Figure 4:
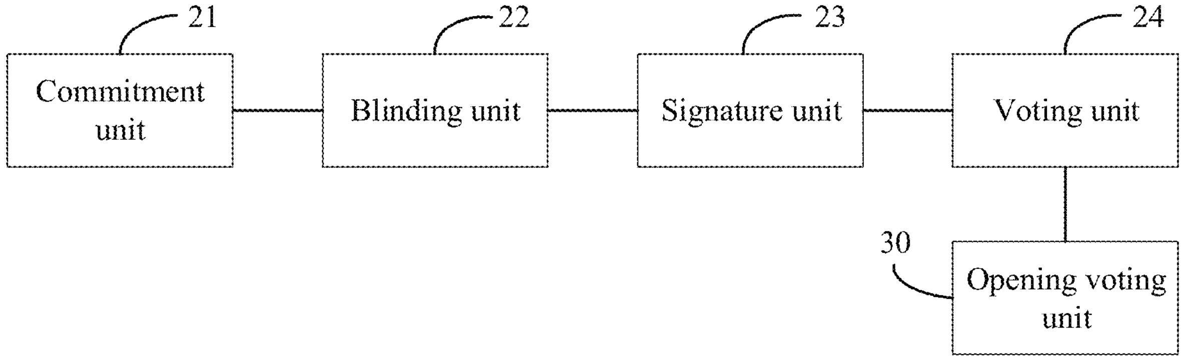
FIG. 4 is a schematic diagram of a trusted anonymous voting apparatus based on a blockchain according to another embodiment of the present disclosure.

In some embodiments of the present disclosure, the hash output mentioned in the commitment unit 21 further includes a commitment value $o_{v_i}$. Referring to FIG. 4, the trusted anonymous voting apparatus based on a blockchain may further include an opening voting unit 30.

The opening voting unit 30 is configured to: obtain the signature tuple $\tilde{d}$ and the commitment value tuple $\tilde{x}$ from the blockchain, and calculate a signature tuple $\tilde{y}$ of other voters based on the signature tuple $\tilde{d}$; verify validity of $y_{n_v}$ based on the commitment value $c_{v_i}$ and the commitment value tuple $\tilde{x}$ by using a preset algorithm VerifyS to obtain all signature elements $y_{n_v}$ that pass the verification, where $y_{n_v}$ represents a signature element in the signature tuple $\tilde{y}$ corresponding to the voter $n_v$; obtain a commitment string $x_{n_v}$ corresponding to each of the signature elements $y_{n_v}$ that pass the verification, establish a new signature tuple $\tilde{y}$ based on all the signature elements $y_{n_v}$ that pass the verification, and establish a new commitment tuple $\tilde{x}$ based on all commitment strings $x_{n_v}$; and upload a vote tuple ($c_{v_i}$, $o_{v_i}$, $\tilde{x}$, $\tilde{y}$) to the blockchain with a random address, where the vote tuple ($c_{v_i}$, $o_{v_i}$, $\tilde{x}$, $\tilde{y}$) serves as voting content in the opening voting stage.

Figure 5:
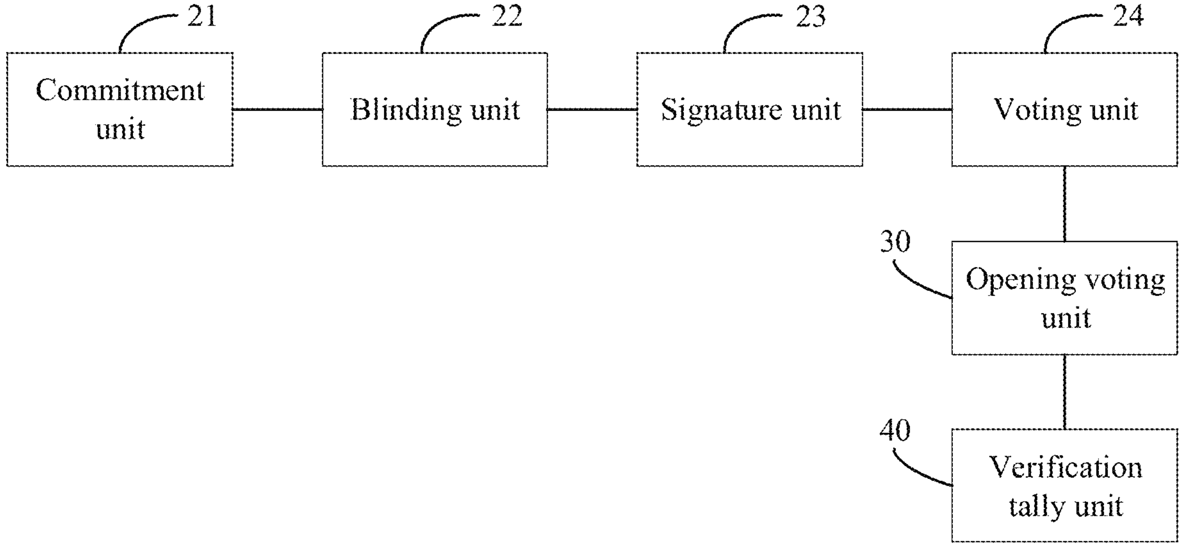
FIG. 5 is a schematic diagram of a trusted anonymous voting apparatus based on a blockchain according to another embodiment of the present disclosure.

In some embodiments of the present disclosure, referring to FIG. 5, the trusted anonymous voting apparatus based on a blockchain may further include a verification tally unit 40.

The verification tally unit 40 is configured to: obtain the vote tuple ($c_{v_i}$, $o_{v_i}$, $\tilde{x}$, $\tilde{y}$) from the blockchain, and verify the signature tuple $\tilde{y}$ by using a preset algorithm V; and verify, in a case that more than a preset proportion of signature elements $\hat{y}$ in the signature tuple $\tilde{y}$ pass the verification, the original voting content based on the commitment tuples $c_{v_i}$ and $o_{v_i}$ by using the preset algorithm.

In some embodiments of the present disclosure, the verification tally unit 40 may verify the original voting content based on the commitment tuples $c_{v_i}$ and $o_{v_i}$ by using the preset algorithm by: serializing the commitment tuple $o_{v_i}$ to obtain a serialized string of commitment tuple $o_{v_i}$; performing the hash operation on the inputted original voting content m and the serialized string of commitment tuple $o_{v_i}$ to obtain a hash value $\hat{c}$; and determining whether $\hat{C}$ is equal to $c_{v_i}$, and determining that the original voting content m passes the verification, in a case that $\hat{c}$ is equal to $c_{v_i}$.

Figure 6:
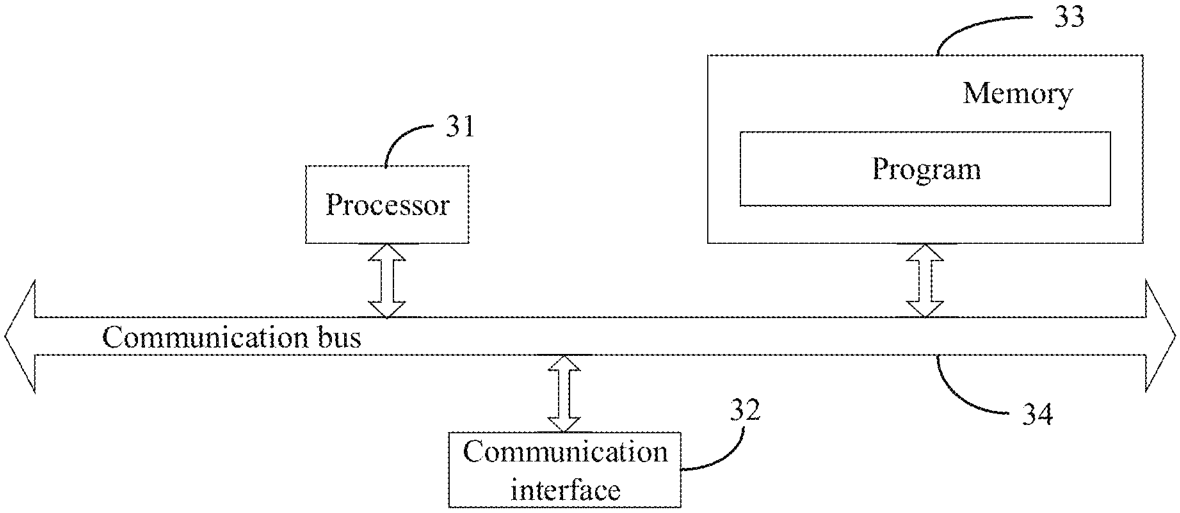
FIG. 6 is a schematic diagram of a trusted anonymous voting device based on a blockchain according to an embodiment of the present disclosure.

The trusted anonymous voting apparatus based on a blockchain according to the embodiments of the present disclosure is applicable to a trusted anonymous voting device based on a blockchain, such as a computer. In an embodiment, FIG. 6 is a block diagram showing a hardware structure of a trusted anonymous voting device based on a blockchain. Referring to FIG. 6, the hardware structure of the trusted anonymous voting device based on a blockchain may include at least one processor 31, at least one communication interface 32, at least one memory 33 and at least one communication bus 34.

In the embodiment of the present disclosure, the number of each of the processor 31, the communication interface 32, the memory 33, and the communication bus 34 is at least one. In addition, the processor 31, the communication interface 32, and the memory 33 communicate with each other through the communication bus 34.

The processor 31 may be a central processing unit (CPU), an application specific integrated circuit (ASIC), one or more integrated circuits configured to implement the embodiments of the present disclosure, or the like.

The memory 32 may include a high-speed RAM memory, and may further include a non-volatile memory and the like, such as at least one disk memory.

The memory 33 stores a program, and the processor 31 may call the program stored in the memory 33. The program is used to: perform a hash operation on original voting content to obtain a hash output, where the hash output includes a commitment value $c_{v_i}$; blind the commitment value $c_{v_i}$ based on information of other voters to obtain a commitment value tuple $\tilde{c}$ and a commitment value tuple $\tilde{x}$; sign the commitment value tuple $\tilde{c}$ by using an ECDSA to obtain a signature tuple $\tilde{s}$; and establish a vote tuple ($\tilde{c}$, $\tilde{s}$, $\tilde{d}$) based on the commitment value tuple $\tilde{c}$, the signature tuple $\tilde{s}$ and a signature tuple $\tilde{d}$ of other voters, and upload the vote tuple ($\tilde{c}$, $\tilde{s}$, $\tilde{d}$) and the commitment value tuple $\tilde{x}$ to the blockchain, where the vote tuple ($\tilde{c}$, $\tilde{s}$, $\tilde{d}$) serves as voting content in a voting stage. The signature tuple $\tilde{d}$ is generated in a case that other voters verify the signature tuple $\tilde{s}$ and the signature tuple $\tilde{s}$ passes the verification. The commitment value tuple $\tilde{x}$ is used to decrypt the vote tuple.

In an embodiment, a refinement function and an expansion function of the program may refer to the above description.

A storage medium is further provided according to an embodiment of the present disclosure. The storage medium stores a program executable by the processor. The program is used to: perform a hash operation on original voting content to obtain a hash output, where the hash output includes a commitment value $c_{v_i}$; blind the commitment value $c_{v_i}$ based on information of other voters to obtain a commitment value tuple $\tilde{c}$ and a commitment value tuple; $\tilde{x}$; sign the commitment value tuple $\tilde{c}$ by using an ECDSA to obtain a signature tuple $\tilde{s}$; and establish a vote tuple ($\tilde{c}$, $\tilde{s}$, $\tilde{d}$) based on the commitment value tuple $\tilde{c}$, the signature tuple $\tilde{s}$ and a signature tuple $\tilde{d}$ of other voters, and upload the vote tuple ($\tilde{c}$, $\tilde{s}$, $\tilde{d}$) and the commitment value tuple $\tilde{x}$ to the blockchain, where the vote tuple ($\tilde{c}$, $\tilde{s}$, $\tilde{d}$) serves as voting content in a voting stage. The signature tuple $\tilde{d}$ is generated in a case that other voters verify the signature tuple $\tilde{s}$ and the signature tuple $\tilde{s}$ passes the verification. The commitment value tuple $\tilde{x}$ is used to decrypt the vote tuple.

In an embodiment, a refinement function and an expansion function of the program may refer to the above description.

In summary, in the present disclosure, a hash operation is performed on the original voting content to obtain the hash output. The hash output includes the commitment value $c_{v_i}$. The hash operation enables the original voting content to be hidden well. Then, the commitment value $c_{v_i}$ is blinded based on the information of other voters, to obtain the commitment value tuples $\tilde{c}$ and $\tilde{x}$, so that identification of the voter is hidden well through the blinding. Next, the commitment value tuple $\tilde{c}$ is signed by using the ECDSA to obtain the signature tuple $\tilde{s}$. The commitment value tuple is signed by the voter himself, so that the voting content is authenticated by the target voter, thereby preventing the voting content from being forged by others. Finally, the vote tuple ($\tilde{c}$, $\tilde{s}$, $\tilde{d}$) is established based on the commitment value tuple $\tilde{c}$, the signature tuple $\tilde{s}$ and the signature tuple $\tilde{d}$ of other voters, and the vote tuple ($\tilde{c}$, $\tilde{s}$, $\tilde{d}$) and the commitment value tuple $\tilde{x}$ are uploaded to the blockchain. The vote tuple ($\tilde{c}$, $\tilde{s}$, $\tilde{d}$) serves as the voting content in the voting stage. The signature tuple $\tilde{d}$ is generated in a case that other voters verify the signature tuple $\tilde{s}$ and the signature tuple $\tilde{s}$ passes the verification. Due to verification and signature by other voters, the target voter cannot tamper with the voting content. The commitment value tuple $\tilde{x}$ is used to decrypt the vote tuple, facilitating subsequent opening of the voting content and tally. In the present disclosure, through the above processing, the voting content is hidden and anonymity and verifiability of the voting are achieved Further, compared with the conventional decentralized anonymous voting solution, the solution in the present disclosure has characteristics of the blockchain such as decentralization, traceability and tamper proof. In addition, compared with other distributed timestamp solution based on a blockchain, this solution has higher efficiency. The present disclosure effectively achieves seven security design goals, namely: fairness (ensuring that anyone is not allowed to obtain ballot results of others before submitting his/her ballot, which indicates that the choice of a voter is not influenced by those who vote ahead), decentralization (ensuring that any kind of trusted third party, such as an election administrator or an independent observer is eliminated from a voting protocol), eligibility (ensuring that a right of he/she is checked before a voter begins to vote; in addition, the eligibility ensures that each voter is allowed to vote only once), anonymity (ensuring that the privacy of the voters is protected to make sure that no one is allowed to know an owner of a ballot from the voting result at the end), compatibility (ensuring that the voting solution is as simple as possible, so that the voting solution can be integrated into an information system of the Internet of energy), verifiability (ensuring that all the stages of voting are audited by the voters, in addition, the validity of each vote is able to be verified by anyone), and coercion resistance (ensuring that the voting solution is coercion-resistant in order to avoid someone trying to coerce the voters to vote by following their instruction). In particular, the trusted anonymous voting solution according to the present disclosure is implemented based on the blockchain, compared with a large number of conventional trusted anonymous voting solutions implemented based on a platform such as a PoW consensus algorithm, the solution according to the present disclosure has a faster transaction processing speed.

Finally, it should be further noted that the relationship terms herein such as first, second and the like are only used to distinguish one entity or operation from another entity or operation, rather than necessitate or imply any actual relationship or order between these entities or operations. Moreover, the terms "comprise", "include", or any other variants thereof are intended to encompass a non-exclusive inclusion, such that the process, method, article, or device including a series of elements includes not only those elements but also those elements that are not explicitly listed, or the elements that are inherent to such process, method, article, or device. Unless explicitly limited, the statement "including a . . . " does not exclude the case that other similar elements may exist in the process, the method, the article or the device other than enumerated elements.

The embodiments in this specification are described in a progressive way, each of which emphasizes the differences from others. The embodiments may be combined as needed, and the same or similar parts among the embodiments may be referred to each other.

The above descriptions of the disclosed embodiments enable those skilled in the art to implement or use the present disclosure. Various modifications to the embodiments are apparent to those skilled in the art, and general principles defined in the present disclosure may be implemented in other embodiments without departing from the spirit or scope of the present disclosure. Therefore, the present disclosure should not be limited to the embodiments described herein but should be defined by the widest scope that complies with the principle and novel features disclosed in this specification.

The invention claimed is:

1. A trusted anonymous voting method based on a blockchain, comprising:

deploying a voting service through Internet of Energy (IoE) that comprises a plurality of electronic voting devices;

performing, by an electronic voting device of the plurality of electronic voting devices, a hash operation on original voting content to obtain a hash output, wherein the hash output comprises a commitment value $c_{v_i}$;

blinding, by the electronic voting device, the commitment value $c_{v_i}$ based on information of other voters to obtain a commitment value tuple $\tilde{c}$ and a commitment value tuple $\tilde{x}$, wherein identity information of a voter is hidden through the blinding;

signing, by the electronic voting device, the commitment value tuple $\tilde{c}$ by using an elliptic curve digital signature algorithm (ECDSA) to obtain a signature tuple $\tilde{s}$; and establishing, by the electronic voting device, a vote tuple ($\tilde{c}$, $\tilde{s}$, $\tilde{d}$) based on the commitment value tuple $\tilde{c}$, the signature tuple $\tilde{s}$ and a signature tuple $\tilde{d}$ of other voters, and uploading the vote tuple ($\tilde{c}$, $\tilde{s}$, $\tilde{d}$) and the commitment value tuple $\tilde{x}$ to the blockchain, wherein the vote tuple ($\tilde{c}$, $\tilde{s}$, $\tilde{d}$) serves as voting content in a voting stage, wherein the signature tuple $\tilde{d}$ is generated in response to successful verification by other voters on the signature tuple, and the commitment value tuple $\tilde{x}$ is used to decrypt the vote tuple, and collecting electronic votes by the plurality of electronic voting devices, wherein the vote tuple serves as one of the electronic votes, wherein the blinding the commitment value $c_{v_i}$ based on information of other voters to obtain a commitment value tuple $\tilde{c}$ and a commitment value tuple $\hat{x}$ comprises:

performing, for each of other voters, a point multiplication operation in an elliptic curve cryptography (ECC) on public key information $pk_j$ and $\hat{pk}_j$ of the voter to obtain a blinding factor $t_j$;

hashing the commitment value $c_{v_i}$ based on the blinding factor $t_j$ to a new commitment value $x_j$ and a new commitment value $c_j$; and collecting commitment values $x_j$ to obtain a commitment value tuple $\tilde{x}$, and signing each of commitment values $c_j$ by using a private key $sk_i$ to obtain the commitment value tuple $\tilde{c}$.

2. The method according to claim 1, wherein the performing a hash operation on original voting content to obtain a commitment value $c_{v_i}$ comprises:

performing the hash operation on the original voting content m and a string o to obtain the commitment value $c_{v_i}$, wherein the string o is randomly generated.

3. The method according to claim 1, wherein the signing the commitment value tuple $\tilde{c}$ by using the ECDSA to obtain a signature tuple $\tilde{s}$ comprises:

performing the hash operation on a tuple ($ID_i$, $addr_i$, $\hat{c}_{n_v}$, to obtain the signature tuple $\tilde{s}$, wherein $ID_i$ and $addr_i$ represent identification and address information of a target voter respectively, and $\hat{c}_{n_v}$ represents a commitment value in the commitment value tuple $\tilde{c}$ corresponding to a voter $n_v$.

4. The method according to claim 1, wherein the hash output further comprises a commitment value $o_{v_i}$, and the method further comprises:

obtaining the signature tuple $\tilde{d}$ and the commitment value tuple $\tilde{x}$ from the blockchain, and calculating a signature tuple $\tilde{y}$ of other voters based on the signature tuple $\tilde{d}$;

verifying validity of $y_{n_v}$ based on the commitment value $c_{v_i}$, and the commitment value tuple $\tilde{x}$ by using a preset algorithm VerifyS to obtain all signature elements $y_{n_v}$ that pass the verification, wherein $y_{n_v}$ represents a signature element in the signature tuple $\tilde{y}$ corresponding to the voter $n_v$;

obtaining a commitment string $x_{n_v}$ corresponding to each of the signature elements $y_{n_v}$ that pass the verification, establishing a new signature tuple $\tilde{y}$ based on all the signature elements $y_{n_v}$ that pass the verification, and establishing a new commitment tuple $\tilde{x}$ based on all commitment strings $x_{n_v}$; and uploading a vote tuple $(c_{v_i}, o_{v_i}, \tilde{x}, \tilde{y})$ to the blockchain with a random address, wherein the vote tuple $(c_{v_i}, o_{v_i}, \tilde{x}, \tilde{y})$ serves as voting content in an opening voting stage.

5. The method according to claim 4, further comprising:

obtaining the vote tuple $(c_{v_i}, o_{v_i}, \tilde{x}, \tilde{y})$ from the blockchain, and verifying the signature tuple $\tilde{y}$ by using a preset algorithm V; and verifying, in a case that more than a preset proportion of signature elements $\hat{y}$ in the signature tuple $\hat{y}$ pass the verification, the original voting content based on the commitment tuples $c_{v_i}$ and $o_{v_i}$ by using the preset algorithm.

6. The method according to claim 5, wherein the verifying the original voting content based on the commitment tuples $c_{v_i}$, and $o_{v_i}$ by using the preset algorithm comprises:

serializing the commitment tuple $o_{v_i}$ to obtain a serialized string of commitment tuple $o_{v_i}$;

performing the hash operation on the inputted original voting content m and the serialized string of commitment tuple $o_{v_i}$, to obtain a hash value $\hat{c}$; and determining whether $\hat{c}$ is equal to $c_{v_i}$, and determining that the original voting content m passes the verification in a case that $\hat{c}$ is equal to $c_{v_i}$.

7. A trusted anonymous voting device based on a blockchain, comprising:

a memory, configured to store a program; and a processor, configured to execute the program to perform a trusted anonymous voting method, wherein the method comprises:

deploying a voting service through Internet of Energy (IoE) that comprises a plurality of electronic voting devices;

performing, by an electronic voting device of the plurality of electronic voting devices, a hash operation on original voting content to obtain a hash output, wherein the hash output comprises a commitment value $c_{v_i}$;

blinding, by the electronic voting device, the commitment value $c_{v_i}$ based on information of other voters to obtain a commitment value tuple $\tilde{c}$ and a commitment value tuple $\tilde{x}$, wherein identity information of a voter is hidden through the blinding;

signing, by the electronic voting device, the commitment value tuple $\tilde{c}$ by using an elliptic curve digital signature algorithm (ECDSA) to obtain a signature tuple $\tilde{s}$; and establishing, by the electronic voting device, a vote tuple $(\tilde{c}, \tilde{s}, \tilde{d})$ based on the commitment value tuple $\tilde{c}$, the signature tuple $\tilde{s}$ and a signature tuple $\tilde{d}$ of other voters, and uploading the vote tuple $(\tilde{c}, \tilde{s}, \tilde{d})$ and the commitment value tuple $\tilde{x}$ to the blockchain, wherein the vote tuple $(\tilde{c}, \tilde{s}, \tilde{d})$ serves as voting content in a voting stage, wherein the signature tuple $\tilde{d}$ is generated in response to successful verification by other voters on the signature tuple, and the commitment value tuple $\tilde{x}$ is used to decrypt the vote tuple and collecting electronic votes by the plurality of electronic voting devices, wherein the vote tuple serves as one of the electronic votes, wherein the blinding the commitment value $c_{v_i}$, based on information of other voters to obtain a commitment value tuple $\tilde{c}$ and a commitment value tuple $\tilde{x}$ comprises:

performing, for each of other voters, a point multiplication operation in an elliptic curve cryptography (ECC) on public key information $pk_j$ and $\hat{p}k_j$ of the voter to obtain a blinding factor $t_j$;

hashing the commitment value $c_{v_i}$ based on the blinding factor $t_j$ to a new commitment value $x_j$ and a new commitment value $c_j$; and collecting commitment values $x_j$ to obtain a commitment value tuple $\tilde{x}$, and signing each of commitment values $c_j$ by using a private key $sk_i$ to obtain the commitment value tuple $\tilde{c}$.

8. A non-transitory computer storage medium, storing a computer program, wherein the computer program, when being executed by a processor, performs the trusted anonymous voting method based on a blockchain according to claim 1.

* * * * *